(12) United States Patent
Martin

(10) Patent No.: US 8,286,379 B2
(45) Date of Patent: Oct. 16, 2012

(54) SUPPORT FOR PLASTIC PLANT IDENTIFIERS

(76) Inventor: Donald E. Martin, Columbus, OH (US)

( * ) Notice: Subject to any disclaimer, the term of this patent is extended or adjusted under 35 U.S.C. 154(b) by 51 days.

(21) Appl. No.: 12/717,397

(22) Filed: Mar. 4, 2010

(65) Prior Publication Data

US 2010/0223825 A1   Sep. 9, 2010

Related U.S. Application Data

(60) Provisional application No. 61/157,978, filed on Mar. 6, 2009.

(51) Int. Cl.
*G09F 3/18* (2006.01)

(52) U.S. Cl. .......................................... 40/645

(58) Field of Classification Search .............. 40/607.05, 40/607.06, 645, 649
See application file for complete search history.

(56) References Cited

U.S. PATENT DOCUMENTS

| | | | | |
|---|---|---|---|---|
| 2,639,524 A * | 5/1953 | Irving | | 40/645 |
| 3,057,093 A * | 10/1962 | Gallo | | 40/645 |
| 4,027,410 A * | 6/1977 | Wheeler | | 40/645 |
| 4,304,059 A * | 12/1981 | Tisbo et al. | | 40/645 |
| 5,040,478 A * | 8/1991 | Hughes | | 116/209 |
| 5,369,902 A * | 12/1994 | Minster | | 40/645 |
| 5,735,075 A * | 4/1998 | Honkawa et al. | | 47/41.12 |
| 6,105,293 A * | 8/2000 | Eason et al. | | 40/645 |
| 6,253,478 B1 * | 7/2001 | Kalavity | | 40/645 |
| 6,401,375 B1 * | 6/2002 | Hickmott | | 40/645 |
| 6,553,701 B1 * | 4/2003 | Neisen et al. | | 40/645 |
| 6,695,703 B1 * | 2/2004 | McGahn | | 463/46 |

* cited by examiner

*Primary Examiner* — Tashiana Adams
*Assistant Examiner* — Shin Kim
(74) *Attorney, Agent, or Firm* — Okuley Smith, LLC

(57) ABSTRACT

A support for thin plastic plant identifiers is configured with a ground engaging stake portion integrally formed with an elevating portion. Integrally formed with the elevating portion and canted rearwardly about 45° is a retainer portion with two parallel engagement channels configured to receive the edges of an identifier. A transverse slot in the retainer portion slidably receives a tail of the plastic identifier.

8 Claims, 1 Drawing Sheet

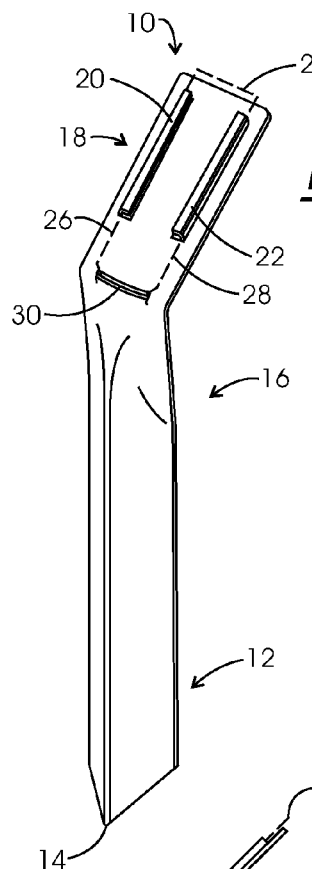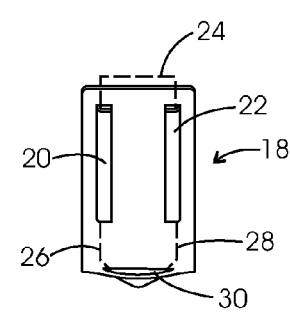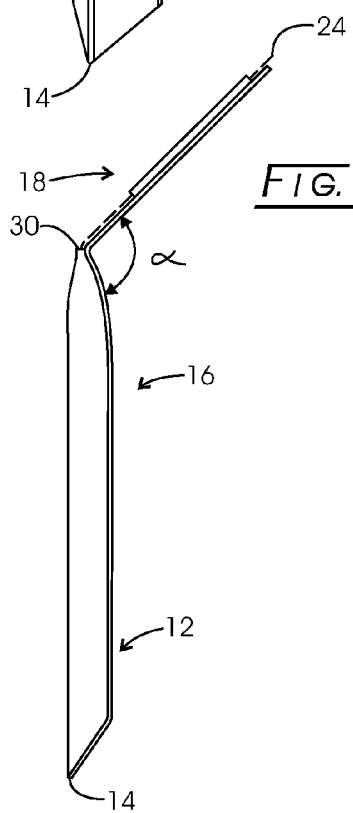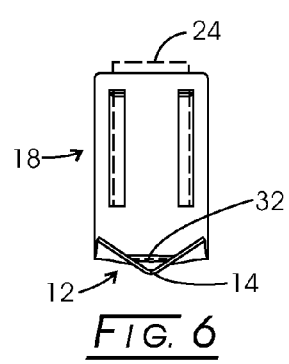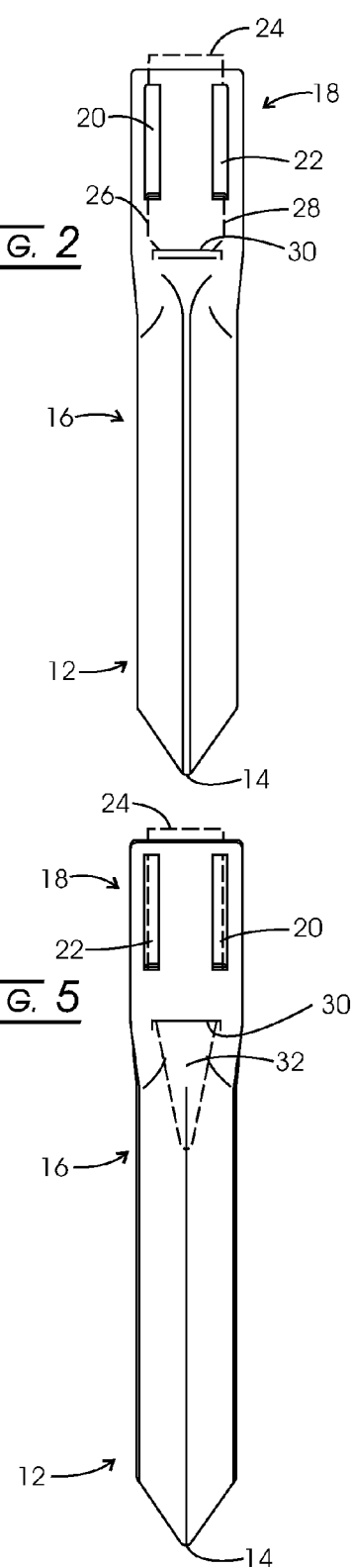

SUPPORT FOR PLASTIC PLANT IDENTIFIERS

CROSS-REFERENCE TO RELATED APPLICATIONS

This application claims benefit of provisional application Ser. No. 61/157,978, filed Mar. 6, 2009.

STATEMENT REGARDING FEDERALLY SPONSORED RESEARCH

Not applicable.

BACKGROUND

The nursery component of the agriculture industry produces extensive numbers of potted transplantable plant life. These potted plants require some form of identification directed to the purchasers of them. One such identifier in popular use is a thin plastic tag which is one inch wide having an information portion 2½ inches long, for instance, carrying a plant name and picture with curt instructions concerning how to grow the plant along with its growth characteristic. Integrally formed with the information portion is a 2½ inch long stake suited for insertion in the ground. Other plant identifiers will, for example, exhibit different dimensions.

Use of the plastic identifiers by gardeners can be frustrating. Generally, the gardener inserts the stake component into the ground next to the just transplanted plant. As the growing season ensues, the identifiers often will be displaced as a collateral result of cultivation or loss within a mulch covering. The devices are not biodegradable and often will emerge from a garden one or more growing seasons later. Finally, when positioned near a plant they may be quite difficult to read, particularly by a standing adult.

BRIEF SUMMARY

The present invention is addressed to a support for plastic identifiers having elongate stake and identifier elevating portions with a length of at least about six inches and an integrally formed plastic identifier retainer portion extending at an inward angle from the elevating portion effective for viewing from the eye station of a standing adult. This retainer portion is configured with two, oppositely disposed and parallel engagement channels located to slidably receive and retain the widthwise periphery of the information portion of a plastic identifier without substantially detracting from the readability thereof. Below these paired engagement channels is a transversely positioned or oriented slot dimensioned to receive an integrally formed identifier stake portion and slidably direct it to the rearward surface of the support elevating portion.

Because of the size and configuration of the staking and identifier elevating portions of the device, it is quite robust and not prone to be displaced by cultivating and mulching activities. Preferably, these two staking and elevating portions are strengthened for ground insertion by being configured with an angular cross section.

Other objects of the invention will, in part, be obvious and will, in part, appear hereinafter.

The invention, accordingly, comprises the apparatus possessing the construction, combination of elements and arrangement of parts which are exemplified in the following detailed description.

For a fuller understanding of the nature and objects of the invention, reference should be made to the following detailed description taken in conjunction with the accompanying drawings.

BRIEF DESCRIPTION OF THE DRAWINGS

FIG. 1 is a perspective view of the support for plastic identifiers illustrating its forward surface in conjunction with a plastic identifier shown in dashed line fashion;

FIG. 2 is a front view of the support of FIG. 1 showing a plastic identifier supported thereby in dashed line fashion;

FIG. 3 is a top view of the support of FIG. 1 showing a plastic identifier in dashed line fashion;

FIG. 4 is a right side view of the support of FIG. 1 showing a plastic identifier supported thereby in dashed line fashion;

FIG. 5 is a rear view of the support of FIG. 1 showing a retained plastic identifier supported thereby in dashed line fashion; and FIG. 6 is a bottom view of the support shown in FIG. 5 revealing the cross section of the stake and elevating portions thereof and further illustrating a retained plastic identifier in dashed line fashion.

DETAILED DESCRIPTION

Referring to FIG. 1, a support for plastic identifiers according to the invention is revealed in general in perspective form at 10. Support 10 is formed with a stake portion represented generally at 12 which extends to a pointed tip 14 and is of length sufficient for insertion into ground near a plant. Integrally formed with and extending upwardly from the stake portion 12 is an elevating portion represented generally at 16. Note that both the stake portion 12 and elevating portion 16 are formed with angularly disposed sides for purposes of developing the structural rigidity necessary to avoid bending during positioning within ground. The combined length of the portions 12 and 16 is 5 at least about six inches.

Integrally formed with and extending above the elevating portion 16 is a plastic identifier retainer portion represented generally at 18. As seen additionally in FIGS. 2 and 3, retainer portion 18 is configured with two oppositely disposed engagement channels 20 and 22 which are parallel and define receiving cavities spaced apart to receive and engage the edges of a plastic plant identifier. Such a plant identifier is represented in phantom at 24. As seen in FIG. 5, these channels 20 and 22 may be formed by stamping. The extent of their overlap over the edges 26 and 28 of the one inch wide and 2½ inch long information portion of the identifier 24 is small enough to avoid blocking the information presented on the forward face thereof.

Below the paired engagement channels 20 and 22 is a transversely oriented or positioned slot 30 having a widthwise extent of less than one inch thus permitting its edges to engage and retain the 2½ inch long information portion of the identifier 24 in position against identifier retainer portion 18 of device 10. However, slot 30 has sufficient width to slidably receive the integrally formed 2½ inch long tail of the identifier 24. FIGS. 1 and 4 reveal that retainer portion 18 of device 10 is angled inwardly an angle, α, of about 45°. The angle selected for this purpose is effective for viewing the plant identifier from the eye station of a standing adult.

Referring to FIG. 5, the stake or tail portion of identifier 24 is shown at 32 having been bent and resiliently engages the inner surface of elevating portion 16. This engagement of stake portion 32 is revealed in FIG. 6. FIG. 6 additionally reveals the angular cross section of portions 12 and 16 which functions to buttress those portions against bending.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. Apparatus for supporting an identifier strip comprising:
   a thin, flat, flexible identifier strip having:
   - an information portion having an inward face, an outward face carrying an information region, a bottom side, and lateral edges; and
   - a tapered insertion tail suitable for insertion in the ground, and having an outward surface, and integrally formed with the information portion bottom side;
   a stake portion configured for substantially upright ground insertion;
   an elevating portion extending outwardly from the stake portion and having an inner surface; and
   a retainer portion having:
   - a forward face and extending above the elevating portion configured with two oppositely disposed and parallel engagement channels configured and spaced apart a distance for slidably receiving the identifier strip and engaging the identifier strip at its lateral edges outwardly of the information region; and
   - a transverse slot for receiving the insertion tail and having a widthwise extent effective to receive the insertion tail in flexure
   wherein the identifier strip is slidably received by the parallel engagement channels engaging the identifier strip inward face and retainer portion forward face, and the insertion tail is inserted into the transverse slot engaging the tapered insertion tail outward surface with the elevating portion inner surface.

2. The apparatus of claim 1 in which:
   said stake portion and elevating portion are integrally formed.

3. The apparatus of claim 2 in which:
   said stake portion and elevating portion are configured as having two sides extending from an apex of an angle effective for providing the structural rigidity to avoid bending during positioning in the ground.

4. The apparatus of claim 1 in which:
   the retainer portion is angled inwardly at a viewing angle with respect to vertical effective for viewing the information region from the eye station of a standing adult person.

5. The apparatus of claim 4 in which:
   said viewing angle is about 45°.

6. The apparatus of claim 1 in which:
   the transverse slot for receiving the insertion tail further has a widthwise extent less than the distance between the spaced apart parallel engagement channels.

7. The apparatus of claim 6 in which:
   said slot is positioned to effect biasing flexure of said strip forwardly against said engagement channels.

8. The apparatus of claim 1 in which:
   the combined length of the stake portion and the elevating portion is at least about six inches.

\* \* \* \* \*